(12) United States Patent
Born et al.

(10) Patent No.: US 12,071,984 B2
(45) Date of Patent: Aug. 27, 2024

(54) ROLLING BEARING WITH MONITORING DEVICE

(71) Applicant: Liebherr-Components Biberach GmbH, Biberach an der Riss (DE)

(72) Inventors: Oliver Born, Altenstadt (DE); Lennart Schierholz, Biberach an der Riss (DE); Wolfram Halder, Unlingen (DE); Martin Dahl, Wettingen (CH); Michael Fuchs, Herbrechtingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 128 days.

(21) Appl. No.: 17/816,648

(22) Filed: Aug. 1, 2022

(65) Prior Publication Data

US 2022/0364605 A1   Nov. 17, 2022

Related U.S. Application Data

(63) Continuation of application No. PCT/EP2021/052594, filed on Feb. 4, 2021.

(30) Foreign Application Priority Data

Feb. 11, 2020  (DE) .................... 10 2020 103 421.0

(51) Int. Cl.
*F16C 19/38*  (2006.01)
*F16C 19/52*  (2006.01)
*F16C 41/00*  (2006.01)

(52) U.S. Cl.
CPC .......... *F16C 41/007* (2013.01); *F16C 19/381* (2013.01); *F16C 19/52* (2013.01); *F16C 2233/00* (2013.01); *F16C 2300/14* (2013.01)

(58) Field of Classification Search
CPC ...... F16C 19/381; F16C 19/52; F16C 41/007; F16C 2233/00; F16C 2300/14; G01P 3/443; G01M 13/04
See application file for complete search history.

(56) References Cited

U.S. PATENT DOCUMENTS

| | | | | |
|---|---|---|---|---|
| 4,259,637 A | * | 3/1981 | Bloomfield | ............. G01P 3/481 |
| | | | | 324/207.16 |
| 5,074,677 A | * | 12/1991 | Andree | ................... F16C 19/52 |
| | | | | 384/622 |

(Continued)

FOREIGN PATENT DOCUMENTS

| | | |
|---|---|---|
| CA | 2536190 | 8/2006 |
| CN | 107429667 | 12/2017 |

(Continued)

OTHER PUBLICATIONS

DE102011076284_A1_DESCRIPTION.*

(Continued)

*Primary Examiner* — Phillip A Johnson
(74) *Attorney, Agent, or Firm* — Levine Bagade Han LLP

(57) ABSTRACT

The invention relates to a rolling bearing with two bearing rings and rolling elements running between same, and a sensor for detecting movements and/or positions of the bearing rings relative to one another, wherein the sensor is fastened to one of the bearing rings and is directed towards a measurement surface on the other bearing ring, wherein said measurement surface comprises a contour projection projecting towards the sensor and/or a contour recess open towards the sensor in the form of a groove or blind hole, which projection or groove influences the measurement signal of the sensor and the movement of which relative to the sensor transverse to the main signal direction of the sensor modifies the measurement signal of the sensor.

20 Claims, 3 Drawing Sheets

(56) References Cited

U.S. PATENT DOCUMENTS

| | | | |
|---|---|---|---|
| 5,336,996 A | 8/1994 | Rusnak | |
| 2012/0106885 A1 | 5/2012 | Ince et al. | |
| 2014/0248014 A1 * | 9/2014 | Schmid | F16C 41/007 384/448 |
| 2015/0323013 A1 | 11/2015 | Herdier et al. | |

FOREIGN PATENT DOCUMENTS

| | | | |
|---|---|---|---|
| DE | 19755000 | | 3/1999 |
| DE | 19919006 | | 11/2000 |
| DE | 102006031718 | | 1/2008 |
| DE | 102008046357 | | 3/2010 |
| DE | 102011076284 A1 * | 11/2012 | ............ F16C 19/381 |
| DE | 102014203517 A1 * | 8/2015 | ............ F16C 41/007 |
| DE | 102016206734 | | 10/2016 |
| DE | 102015218993 | | 12/2016 |
| DE | 102015224859 | | 6/2017 |
| DE | 102016223883 | | 6/2018 |
| EP | 1528356 A2 * | 5/2005 | ............ F16C 19/166 |
| EP | 1873508 | | 1/2008 |
| EP | 2092204 | | 8/2012 |
| EP | 2743522 | | 6/2014 |
| EP | 1528356 B1 | | 1/2015 |
| IT | TO 20110482 A1 | | 12/2012 |
| JP | 2006-317420 | | 11/2006 |
| JP | 2007-198886 | | 8/2007 |
| JP | 2012-067906 | | 4/2012 |
| JP | 2012-067907 | | 4/2012 |
| JP | 2018-096469 | | 6/2018 |
| WO | WO 2003/044381 | | 5/2003 |
| WO | WO 2008/088213 | | 7/2008 |
| WO | WO 2012/002867 | | 1/2012 |
| WO | WO 2016/152797 | | 9/2016 |
| WO | WO 2017/179470 | | 10/2017 |
| WO | WO 2021/160500 | | 8/2021 |

OTHER PUBLICATIONS

EP1528356_A2_DESCRIPTION.*
Yang Zu-dong et al., "A Novel Measuring Instrument for Surface Topography of Bearings", Bearing, No. 4, pp. 33-36, 2007.
Zhou Peng et al., "Detector Design of Main Bearing Wear for Diesel Engines Based on Eddy Current Sensor", Instrument Technique and Sensor, No. 2, pp. 75-78, 2018.

* cited by examiner

ROLLING BEARING WITH MONITORING DEVICE

CROSS-REFERENCE TO RELATED APPLICATIONS

This application is a continuation of International Patent Application Number PCT/EP2021/052594 filed Feb. 4, 2021, which claims priority to German Patent Application Number DE 10 2020 103 421.0 filed Feb. 11, 2020, all of which are incorporated herein by reference in their entireties.

BACKGROUND

The present invention relates to the monitoring of rolling bearings, in particular in the form of open-centered large rolling bearings, by means of a monitoring device with a contactless sensor. In this respect, the invention relates in particular to a rolling bearing with two bearing rings and rolling elements running between same, and a sensor for detecting movements and/or positions of the bearing rings relative to one another, wherein sensor is fastened to one of the bearing rings and is directed towards a measurement surface on the other bearing ring.

Large rolling bearings can have diameters of one meter or more, or even several meters, and are often configured to be open-centered so that the center bore of the inner bearing ring remains substantially free and is not seated on a solid shaft. The two concentric bearing races, which can rotate relative to one another and between which a plurality of rolling elements can be disposed in a bearing gap, for example one or a plurality of thrust bearings and/or one or a plurality of radial bearings, can sometimes be rotated relative to one another by one or a plurality of rotary drives, one of the bearing rings for example being provided with toothing and the other bearing ring supporting one or a plurality of drive motors. At least one of the bearing rings can be connected to a connecting flange of the component supporting the bearing ring through a screw connection usually disposed parallel to the axis of rotation of the bearing.

Such large rolling bearings are configured as single-row or multi-row bearings with various rolling elements such as balls, rolling cylinders, rolling cones, etc. and are used in cranes, excavators, mining muck removal equipment or wind turbines.

Due to the high forces and bending moments that need to be supported, said bearing rings are subject to twisting and deformation and can tilt relative to one another, whereas the strong occurring forces also generate corresponding bearing wear.

For the purpose of minimizing or reducing wear, in case of such large rolling bearings, what is important is permanent and reliable lubrication, since otherwise, due to the very high loads and also the often quite special operating conditions, which go along with environmental impacts such as salt spray, heavy rain, dust and temperature fluctuations, damage to the raceways and the rolling elements will develop fairly fast. However, due to the often quite low speeds of rotation, uniform lubrication is difficult. The speeds with large rolling bearings are as a rule below 250 r.p.m. In many applications, the bearings often stand completely still for long periods of time or continuously return to the same position, as is the case, for example, with pitch angle bearings on rotor blades of a wind turbine that frequently have the same pitch angle set. With such slowly rotating and/or often standing still large rolling bearings, the lubricant is distributed evenly over the total bearing with difficulty and in particular the highly loaded rolling elements and thus the raceway portions in engagement therewith are heavily loaded.

A large rolling bearing of initially named type is shown, for example, in EP 20 92 204 B1, in which one bearing ring has a scraper ring that engages in a groove in the other ball race and is supported there by oppositely disposed thrust bearings and radial bearings. The document WO 2008/088 213 A2 shows a similar large rolling bearing and its installation situation at the support mast of a ship crane.

For the purpose of ensuring access to information on advancing wear and/or being able to plan maintenance and repair measures such as relubrication, replacement of rolling elements, etc. in a timely manner, rolling bearings are monitored by means of monitoring devices which will determine indications of wear such as axial bearing movements of the bearing rings relative to one another or tilting movements of the bearing rings, thus enabling the wear condition to be estimated on the basis of occurrence or extent of such movements. At the same time, it is also helpful to know the rotational position and/or speed and/or the revolutions or angles of rotation covered, since, for example, the revolutions covered also constitute an indicator of possible wear, while ring offset movements in a certain rotational angle position can provide conclusions to damaged bearing ring portions.

From the prior art document EP 15 28 356 B1, there is known a monitoring device for monitoring large rolling bearings, comprising several path measurement sensors to determine tilt movements of the bearing rings relative to one another. One displacement sensor detects radial movements, for example in the form of changes in a radial gap, and another path measurement sensor detects axial movements, which are reflected in the form of changes in an axial gap, in order to determine the tilting of the bearing rings relative to one another from the detected radial and axial movements. Said sensors are each recessed in a bore in one of the bearing rings and monitor an oppositely disposed measurement surface on the other bearing ring, wherein said sensors determine the distance of the sensor head from the oppositely disposed measurement surface in a contactless manner.

A monitoring device is known from U.S. Pat. No. 5,336, 996B that can determine the direction and speed of rotation in addition to radial and axial wear of the bearing. For this purpose, a large number of magnetic elements are embedded in the circumferential direction on the circumferential surface of a rotary ring, which can be detected by an oppositely disposed Hall sensor. In this respect, on the one hand, the direction of rotation and the speed of rotation are determined by a plurality of magnets that pass by the Hall sensor. In addition, an axial offset is determined from the overlap between the magnet plates and the Hall sensor.

The monitoring devices that have been used in practice up to now are usually quite expensive and complex to wire. In particular, if both radial and axial movements are to be detected with a plurality of sensors, quite a lot of installation space is required not only for the cabling but also for the sensors.

At the same time, protecting sensor technology against external impacts and damage is complex and expensive, which is nevertheless necessary since the entire sensor usually fails whenever even just one sensor breaks down.

At the same time, achieving high measurement accuracy requires a great deal of effort. For example, in measurement systems for measuring on inclined surfaces in order to determine axial and radial movements, the angle of inclination must be measured and specified with a high degree of accuracy, otherwise tolerance errors can easily occur.

SUMMARY

It is therefore the underlying object of the present invention to provide an improved monitoring device for monitoring rolling bearings as well as an improved rolling bearing with such a monitoring device, which avoids disadvantages of prior art and further develops the latter in an advantageous manner. In particular, the aim is to provide a space-saving, simple-to-assemble and yet accurate monitoring device that can reliably and precisely detect or determine bearing wear and/or bearing deformations and/or bearing rotation angles or bearing speeds even under adverse operating conditions.

Said task is solved, according to the invention with a rolling bearing according to claim 1. Advantageous arrangements are the subject-matter of the dependent claims.

Thus, in accordance with one aspect of the present invention, it is proposed that a measurement surface on the bearing ring that is scanned by the sensor in a contactless manner be formed in a particular manner so as to produce a sufficient, precisely identifiable signal modification in the response signal even in the event of minor positional displacements or movements of the bearing rings relative to one another. This is based on the assumption that, with the scanning of smooth ring surfaces that has been carried out up to now, in itself only a distance measurement is possible or there must be used certain surfaces, in particular magnetized surfaces, in order to achieve a sufficient signal modification. According to the invention, said measurement surface on the bearing ring, towards which the sensor fastened to the other bearing ring is directed, comprises a contour projection projecting towards the sensor and/or a contour recess in the form of a groove or blind hole, which projection or groove influences the measurement signal and/or the movement of which relative to the sensor modifies the measurement signal of the sensor. By means of a specially formed contour projection and/or a recess in the form of a groove or blind hole embedded in the bearing ring, not only the distance of the sensor head from the oppositely disposed measurement surface or the gap width can be detected, but also the position and movement of said contour projection and/or contour recess transverse to the viewing direction of the sensor.

Said contour projections and/or recesses are advantageously not shaped in a harmoniously rounded or gently undulating or gently corrugated manner, but rather in an angular, in particular sharp-edged contour, in order to enable simpler and more precise detection.

In particular, the contour projection can be an elongated, narrow strip projecting from the surface of the bearing ring monitored by the sensor and having a narrow end face directed towards the sensor or projecting towards the sensor.

Alternatively or additionally in such a fine-wall strip there can advantageously be recessed or formed as a contour recess a narrow groove and/or a blind hole in the surface of the bearing ring monitored by the sensor, wherein said groove or hole can be formed with its open side facing the sensor and with its depth away from the sensor.

Advantageously, the projecting or recessed contour has at least one straight or curved edge, such as the longitudinal edge of a groove or the edge of a hole, which positively affects the desired influence on the scanning signal.

Said contour projections and/or recesses are configured in particular in such a way that they affect the sensor signal and modify the signal response when the contour is moved past the sensor transversely to the viewing direction of the sensor and/or the position of the contour is modified transversely to the viewing direction of the sensor. What is meant by the viewing direction of the sensor is the main axis of the scanning signal, wherein the sensor can be mounted in particular in such a way that said viewing direction is directed essentially perpendicular to the oppositely disposed surface of the bearing ring.

Said contour projection and/or said contour recess can in principle be materially homogeneous and integrally formed as a single piece from the material of the bearing ring. For example, a projection in the form of a strip or ridge can be machined out of the ring surface by removing the adjacent surface regions, or it can also be formed onto it in another material-homogeneous manner, for example during forging and/or casting or another machining step. Similarly, for example, an elongated, narrow measurement groove may be milled or turned out into the surface of the ring, or otherwise inserted therein, so that the surfaces of the projecting or recessed contour are formed directly by the material of the bearing ring.

Alternatively, however, the projecting or recessed contour element may be at least partially formed by a separate contour element fixedly attached to the bearing ring. For example, a bar-shaped plate may be attached to the sensor-scanned ring surface in a projecting manner, such as being inserted into a slot so that a strip portion projecting from the slot still projects towards the sensor.

Such a separate contour element can basically be made of the same material as the bearing ring. Alternatively, the separate contour element can also be made of a different material. For example, said contour element may be a metal plate, such as one made of a different alloy than the bearing ring, or it may be a magnetic element.

Alternatively or additionally, the projecting and/or recessed or embedded measurement contour can also consist of a mixed shape comprising a material-homogeneous partial contour integrally formed on the bearing ring and a partial contour formed by a separate contour element. For example, a separately formed web projection, which is fastened to the sensor-scanned surface of the ring, can be provided next to a series of blind holes in order to be able to detect, on the one hand, axial displacements of the bearing rings and, on the other hand, the rotational position and/or the rotational angle and/or the rotational speed of the bearing rings relative to one another.

In particular, the projecting and/or fluted measurement contour may also include contour portions made of different materials that modify the measurement signal in different ways. For example, a recessed groove in the sensor-scanned surface of the ring can be at least partially filled with a material different from the ring material in order to use the filling material to create a scanning contour different from the bottom of the groove. Advantageously, the ring material can be selected to be at least partially permeable to the measurement signal so that two different signal responses to one sensing signal are obtained. On the one hand, the groove contour formed by the ring material influences the measurement signal, and on the other hand, the filler material contour influences the measurement signal.

If such different materials are used to form different contour portions, it may be advantageous if the surface contours formed by the different materials are inclined to one another and/or set at a different angle with respect to the viewing direction of the sensor. For example, a groove that is V-shaped or sawtooth-shaped in cross-section can be filled with a filler material the surface of which is essentially parallel to the surrounding surface on the bearing ring. This enables the inclined bottom or wall contour of the groove to be scanned and, at the same time, the filling material contour perpendicular to the viewing direction of the sensor to be scanned.

Alternatively or additionally, however, a projecting contour can also be formed from a different material, for example by gluing on a measurement contour strip, which can be made from a different material than the bearing ring.

The projecting and/or recessed measurement contour can be configured in various ways in order to be able to determine different bearing measurement variables.

In particular, the sensor and the measurement contour cooperating therewith can be configured to determine the axial position of the two bearing rings relative to one another. In large rolling bearings, an axial displacement of the two bearing rings relative to one another is typically a reliable measure of bearing wear, since axial wear occurs primarily due to high axial forces and is reflected in a displacement of the bearing rings relative to one another in the axial direction.

In order to be able to measure the axial position of the two bearing rings precisely, the sensor can advantageously monitor or scan a circumferential surface of the other bearing ring, wherein said, preferably strip-shaped or web-shaped contour projection can be provided on the scanned circumferential surface. Alternatively or additionally, a narrow longitudinal groove may be provided on said circumferential surface.

The contour projection on the circumferential surface can, in particular, form a radially projecting web which can extend in a plane perpendicular to the axis of rotation of the bearing, wherein said web or projection can be formed circumferentially over the entire circumference of the bearing ring. Alternatively, it may also be sufficient to form the contour projection in only one ring segment, especially if the bearing is one that has significant operating times, especially idle times in a particular position, as is the case, for example, with the zero position of rotor blade bearings that are often held in a particular pitch position.

Alternatively or additionally to such a circumferentially extending, radially projecting web, however, a groove may be formed in said scanned circumferential surface which forms a depression in said circumferential surface and extends away from the sensor into said circumferential surface. Such a groove can also be configured circumferentially over the entire circumferential surface and extend in a radial plane. Alternatively, it may be sufficient to form one in only one sector of the bearing ring.

Alternatively or additionally, however, the sensor or another sensor and the contour of the measurement surface cooperating therewith can also be provided to determine radial movements of the two bearing rings relative to one another. In order to detect such radial movements or modifications in the radial position of the two bearing rings, the measurement surface can form an axial surface on which a preferably strip-shaped contour projection can project axially, wherein such a contour projection can extend parallel to a cylindrical surface and/or be configured in the circumferential direction on the axial surface.

Alternatively or additionally, an arc-shaped curved groove can be embedded or machined into said axial surface, which can extend in the circumferential direction or be formed parallel to a cylinder surface.

The sensor scanning said axial surface can be directed with its main scanning direction or viewing direction parallel to the axis of rotation to said axial surface in order to be able to detect transverse displacements of the circular arc-shaped groove and/or the circular arc-shaped projection in radial direction.

Advantageously, therefore, the contour projection and/or the contour recess can be provided on a surface of the bearing ring which is aligned per se parallel and/or tangential to the detection of the displacement, so that the projection and/or the recess move transversely to the viewing direction of the sensor. Axial displacement is therefore measured by scanning a circumferential surface and radial displacement is measured by scanning an axial surface extending in a plane perpendicular to the axis of rotation of the bearing or the contour projections and/or recesses provided thereon.

Alternatively, however, it would also be possible in principle to measure a radial displacement, for example, by measuring the distance between the sensor and a circumferential surface, and/or to determine the axial displacement by measuring the distance between the sensor and an axial surface. This would substantially be the determination of the gap dimension between the sensor and the oppositely disposed measurement surface.

Advantageously, axial displacements and radial displacements can also be determined by only one, for example by the sensor monitoring a circumferential surface on the oppositely disposed bearing ring and, on the one hand, measuring the axial displacement of a contour projection and/or a contour recess provided on the circumferential surface and, on the other hand, measuring the radial distance to said circumferential surface or the contour projection and/or contour recess provided thereon in order to determine the radial displacement.

Alternatively or additionally to the measurement of relative movements of the bearing rings to one another in axial direction and/or radial direction, the sensor and the measurement surface cooperating therewith can, however, also be provided to measure the rotational position and/or rotational movement and/or rotational speed of the two bearing rings to one another. For this purpose, provision can be made for a plurality of contour projections and/or recesses, which are arranged one behind another or next to one another at a distance from one another in the circumferential direction, so that said contour projections and/or recesses run past the sensor one after the other when the two bearing rings are rotated relative to one another.

Said contour projections and/or recesses can be advantageously configured in a circumferential surface of the bearing ring scanned by the sensor, in particular in a common plane extending perpendicular to the axis of rotation of the bearing.

The contour projections for determining the rotational position and/or the rotational speed can be arranged spaced from one another at a uniform division each projecting radially towards the axis of rotation. When contour depressions are formed, for example in the form of slots or holes, these can also be arranged at a uniform division and extend radially.

The sensor can advantageously be recessed in one of the bearing rings, in particular completely recessed, so that the sensor is protected from external impacts such as mechanical stresses by the surrounding body of the bearing ring.

The sensor can be installed in the bearing ring in a radial direction so that a longitudinal sensor axis extends substantially radially to the axis of rotation of the bearing.

In an alternative further development of the invention, however, it would also be possible to install the sensor axially with its longitudinal sensor axis so that said longitudinal sensor axis extends substantially parallel to the bearing axis of rotation. Depending on the mounting of the sensor, the available space in the bearing ring can be used in the best possible way.

In an advantageous further embodiment of the invention, the sensor can be arranged on one side of all rolling elements, so that rolling elements are arranged on only one side of the sensor, while no rolling elements are located on the opposite side of the sensor.

If one of the bearing rings has a ring nose which is received in a groove in the other bearing ring and is supported by rolling elements in the gap between the scraper ring and the groove, the sensor can be arranged in a region of the bearing ring which does not form the scraper ring and also does not form the groove receiving the latter, but is located adjacent to said scraper ring.

Also, in an alternative embodiment of the invention, the sensor may be arranged between rows of rolling elements and/or monitor a measurement surface between rows of rolling elements. For example, the sensor may be arranged between a row of radial bearings and a row of thrust bearings and monitor a measurement surface located between a row of thrust bearings and a row of radial bearings.

In principle, the sensor can be configured to work in different ways. According to an advantageous embodiment, provision can be made for an inductive sensor to accurately detect the contour projection and/or the contour recess and their position. Said contour projection and/or contour recess may be made of a conductive and/or ferromagnetic material to passively or actively affect the signal.

For example, provision can be made for a metallic web projection to affect the signal from the inductive sensor when said web-shaped projection is moved relative to the sensor, which occurs whenever the bearing ring with the projection moves relative to the bearing ring to which the sensor is fastened. Alternatively, for example, a ferromagnetic web plate can be attached to the bearing ring as a projection to actively affect the measurement signal of the inductive sensor when a corresponding relative movement occurs.

As an alternative to such an inductive sensor, however, provision can also be made for another sensor, for example an ultrasonic sensor, an optoelectrical sensor or even a capacitive sensor, in order to precisely measure the exact position of the contour projection and/or the contour recess relative to the sensor. Regardless of the measurement principle, the sensor is advantageously configured to be able to measure the position and/or movement of a web-shaped contour projection and/or a slot-shaped or hole-shaped contour recess.

BRIEF DESCRIPTION OF THE DRAWINGS

The invention is explained in more detail below on the basis of a preferred exemplary embodiments and the corresponding drawings. There are shown in the drawings.

DETAILED DESCRIPTION

The rolling bearing 1 shown in the figures may be configured as a large rolling bearing, the diameter of which may be one or more meters and may be open-centered. The two bearing rings 2 and 3 can be rotated relative to one another and are supported against one another by a plurality of rows of rolling elements, wherein provision can be made for one or a plurality of rows of thrust bearings and one or a plurality of rows of radial bearings.

Figure 1:
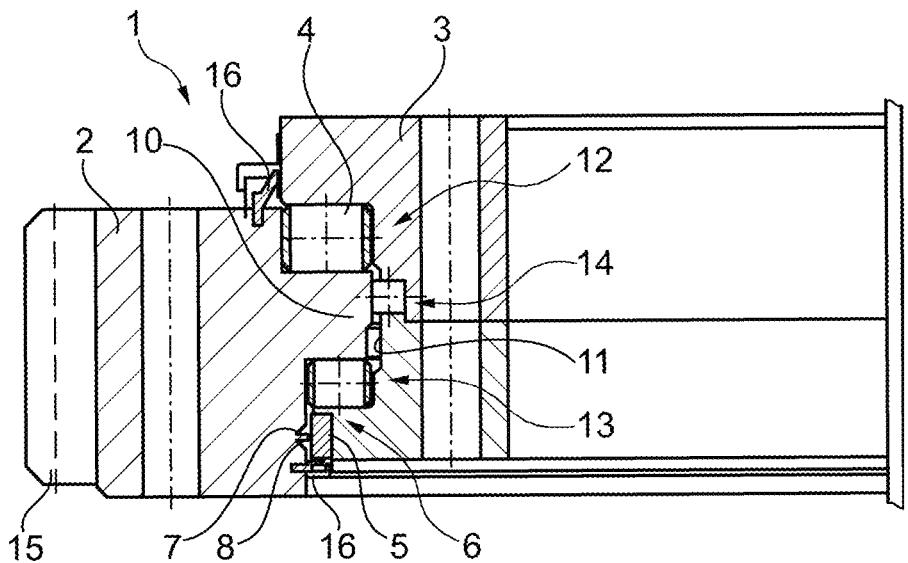
FIG. 1: an open-centered large rolling bearing the bearing rings of which are supported against one another by two rows of thrust bearings and one row of radial bearings, wherein a sensor is radially integrated in one bearing ring for measuring axial offset of the two bearing rings and monitors a projection on the oppositely disposed measurement surface of the other bearing ring.
Figure 2:
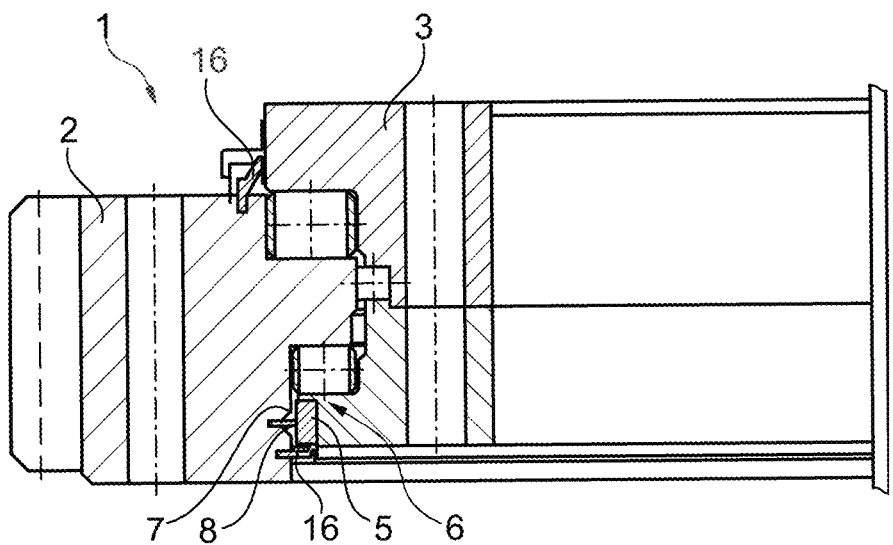
FIG. 2: a large rolling bearing with a sensor for measuring axial offset similar to the large rolling bearing of FIG. 1, wherein the web-shaped contour projection on the oppositely disposed measurement surface was inserted as a separate contour element into a slot in a circumferential surface of the scanned bearing ring.
Figure 3:
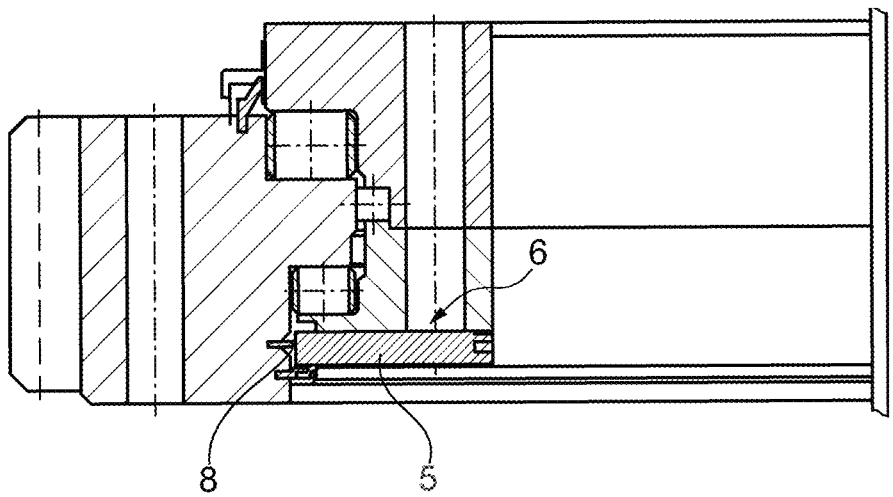
FIG. 3: a large diameter rolling bearing similar to the two foregoing figures, with the sensor installed axially.

As FIGS. 1 to 3 show, for example, one of the bearing rings, for example the outer bearing ring 2 may have a scraper ring 10 projecting towards the other bearing ring 3, for example the inner bearing ring, which engages in a groove 11 in the other bearing ring 3. The rolling bearings 4 may be arranged in the gap between the scraper ring 10 and the groove 11, with, for example, two rows of thrust bearings 12 and 13 and a row of radial bearings 14 between them, supporting the scraper ring 10 against the groove 11.

One of the bearing rings, for example the outer bearing ring 2, may be provided with teeth 15 with which the drive pinion of a drive motor not shown in more detail may mesh in order to rotationally drive said bearing ring 2. The other bearing ring, for example the inner bearing ring 3, can be fastened vertically to an installation surrounding part. Said drive motor may be fastened to the inner bearing ring 3 or to a connecting portion of the mounting environment attached thereto to drive the toothing 15.

The bearing gap between the two bearing rings 2, 3 can be sealed by a suitable seal 16, wherein the rolling elements 4 can run in the sealed bearing gap between the seals 16.

As FIG. 1 shows, a sensor 5 is attached to one of the bearing rings, for example to the inner or upright bearing ring 3, which can advantageously be arranged recessed in the body of the bearing ring 3, for example integrated in a corresponding sensor opening, so that the sensor 5 is accommodated, in particular completely accommodated, within the bearing ring body or within the bearing dimensions.

As a comparison of FIGS. 1 and 2 on the one hand and FIG. 3 on the other hand shows, the sensor 5 can be installed radially in the bearing ring 3, or can also be received axially therein, in order to make the best possible use of the space conditions depending on the installation position and/or to be arranged favorably depending on the oppositely disposed measurement surface to be monitored.

As shown in FIGS. 1 to 3, the sensor 5 can be arranged on one side of all rolling elements 4, for example below all rolling elements 4 or even above all rolling elements 4. Advantageously, the sensor and/or the measurement surface 7 associated therewith is arranged within the bearing gap arranged away from the seal 16.

As shown in the figures, the sensor 5 can advantageously be directed to or face with its main measurement direction or "facing direction" towards am oppositely disposed measurement surface 7 on the other bearing ring 2, which measurement surface 7 can advantageously be a circumferential surface of the other bearing ring 2. If the sensor 5 is fastened to the inner bearing ring 3, the measurement surface 7 can be an inner circumferential surface of the outer bearing ring 2.

As shown in FIGS. 1 to 3, said measurement surface 7 may have a contour projection 8 projecting towards the sensor 5, which may project radially towards the sensor 5 from said circumferential surface.

Advantageously, said contour projection 8 may form a projection strip extending in the circumferential direction and projecting radially from the circumferential surface towards the sensor 5. The strip-shaped contour projection 8 may extend parallel to a plane oriented perpendicular to the bearing axis of rotation.

As shown in FIG. 1, said contour projection 8 can be materially homogeneous, integrally machined in one piece into the material of the bearing ring 2, wherein, for example, material can be removed from the bearing ring 2 on both sides of the contour projection 8 in order to allow the remaining web to be projected.

As shown in FIG. 1, the strip-shaped projection 8 can be bordered on both sides by a depression and/or a groove in the adjacent portion of the circumferential surface in order to allow the contour projection 8 to project sufficiently far from the material of the bearing ring 2 with only a limited radial projection over the circumferential surface.

The strip-shaped contour projection 8 can extend over the entire circumference of the bearing ring 2 or only over a sector of said bearing ring 2 if said sector is often enough in the region of the sensor 5, as is usually the case with a pitch bearing of a rotor blade.

As shown in FIG. 2, however, the contour projection 8 can also be formed by a separate contour element which is inserted into the material of the bearing ring 2, in which case the contour projection 8 can also be a narrow strip which extends in the circumferential direction, projects radially towards the sensor 5 and faces the sensor 5 with a narrow end face. For example, such a separate contour element for forming the contour projection 8 may be inserted in a slot which has been made in the bearing ring 2 and in which said contour element is firmly inserted, for example in the form of a small plate.

Said sensor 5 can be, for example, an inductive sensor that can accurately measure the position of the contour projection 8. If the contour projection 8 is moved past the sensor 5 transversely to the main viewing direction of the sensor when axial wear of the rolling bearing 1 occurs, the sensor signal is modified. Depending on the material of the contour projection 8, it can affect the signal passively or actively. However, said sensor 5 can also operate on a different principle, for example be an ultrasonic sensor.

Figure 4:
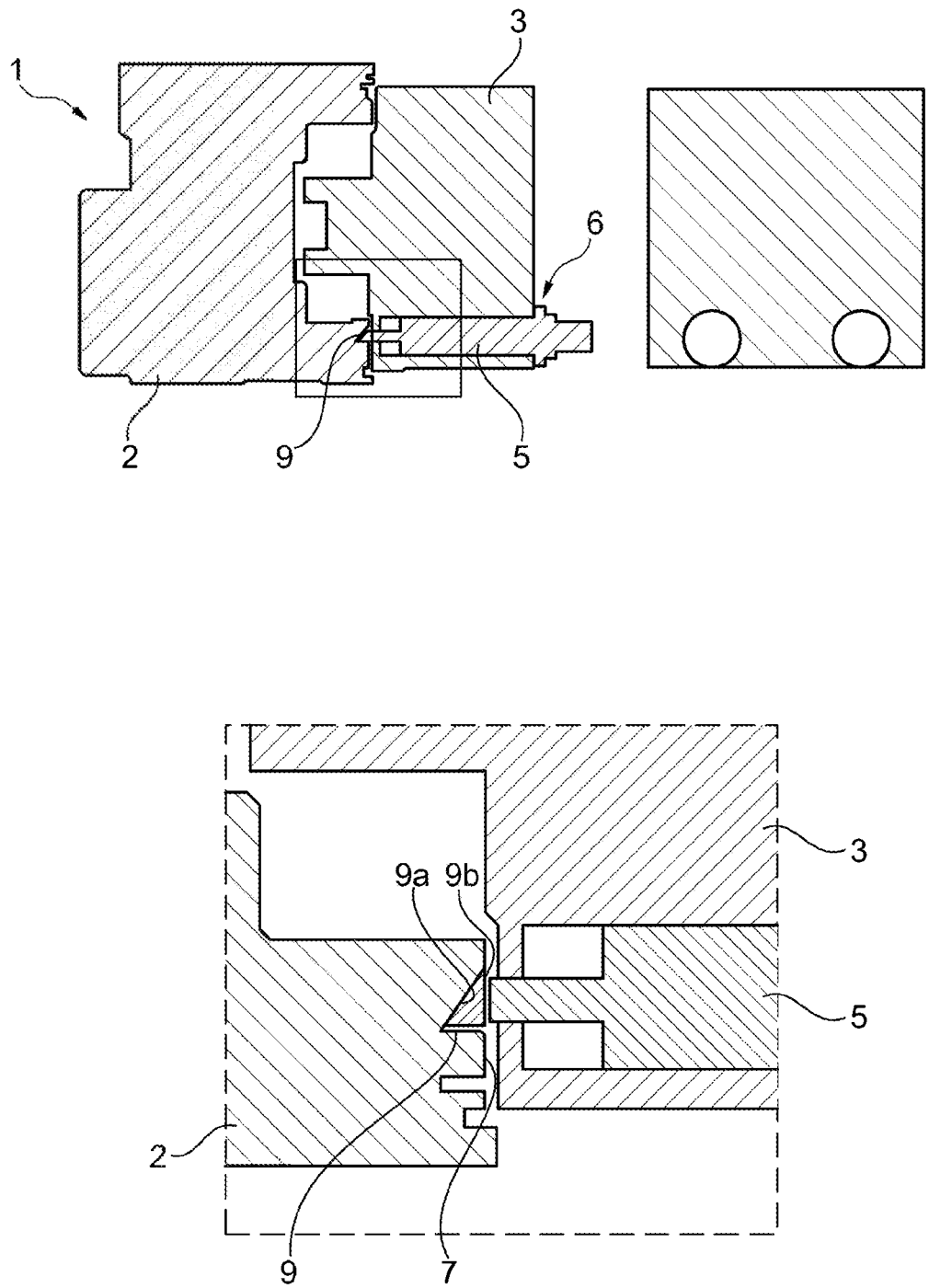
FIG. 4: a partially sectional view of a large rolling bearing with a sensor that scans an oppositely disposed measurement surface made of different materials and generates different signal responses due to the different contour portions made of different materials.

As FIG. 4 shows, the measurement surface 7 can also be provided with a contour recess 9 in the form of a narrow longitudinal groove, which can extend in the circumferential direction on the circumferential surface of the bearing ring 2.

Regardless of the design as a contour projection or contour recess, it can be advantageous if the measurement contour formed on the measurement surface 7—in the form of a contour projection and/or a contour recess—has two contour portions which consist of different materials and/or are arranged in differently inclined planes. These contour portions made of different materials and/or in different inclinations thereby advantageously work together with the sensor 5, which can detect different inclinations and/or different materials.

As shown in FIG. 4, for example, a groove with a saw-tooth-shaped or triangular cross-section can be provided as a contour recess 9 which is at least partially filled with a filler material 17. The bottom of the circumferential groove or the obliquely inclined wall portion of the contour recess 9 thereby provides one signal response, while the surface of the filling material 17, which is substantially oriented perpendicular to the main viewing direction of the sensor 5, generates a second signal response. In this case, said filler material 17 can be at least partially configured to pass through the signal in order to be able to scan the underlying contour of the groove.

Figure 5:
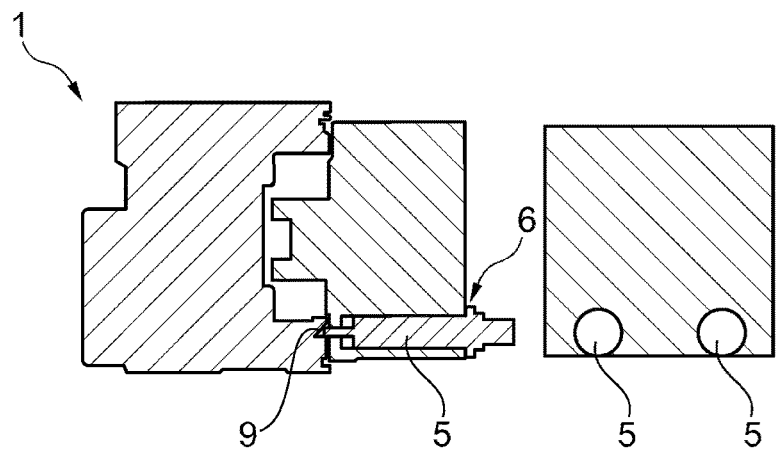
FIG. 5: a partial sectional view of a large rolling bearings similar to FIG. 4, with the various contour portions made of different materials being scanned by two separate sensors.
Figure 5:
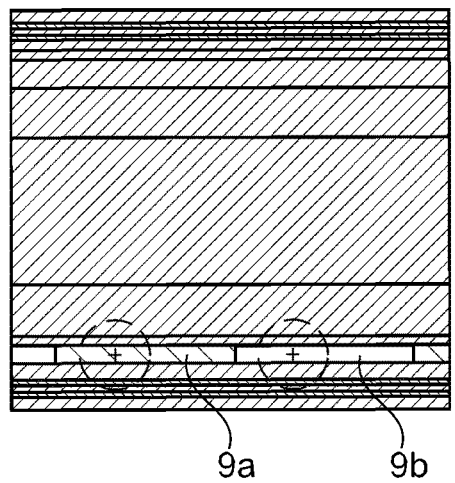

As FIG. 5 shows, two sensors 5 can also be provided to separately scan the contour portions 9a and 9b, which are made of different materials and/or are inclined at different angles, in order to be able to determine the axial and radial position and/or movement of the two bearing rings 2 and 3 relative to each other from the two signal responses or sensor signals of the two sensors.

As FIG. 5 shows, for example, two sensors 5 can be fastened to the bearing ring 3, in particular integrated in it, offset from one another in the circumferential direction. The oppositely disposed measurement surface 7 on the other bearing ring 2 can have alternating contour portions 9a and 9b of different materials in the circumferential direction, to which the two sensors 5 or their signals react accordingly in order to be able to determine the axial position and radial position of the two bearing rings 2 and 3 relative to one another from the signal pattern.

The contour portions 9a and 9b of the measurement surface 7 can be worked into the bearing rings 2 and 3, or also applied to them, for example glued on.

Figure 6:
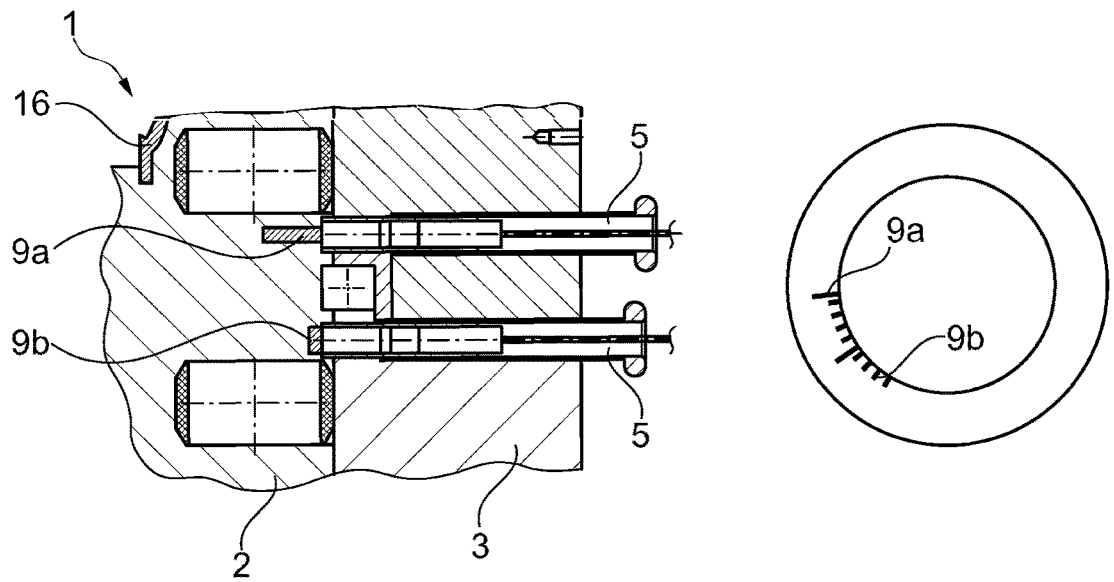
FIG. 6: a partially longitudinal sectional and cross-sectional view of a large rolling bearing with two sensors that scan circumferentially spaced contour depressions and/or projections to measure the rotational position and speed of the bearing rings relative to one another.

FIG. 6 shows an embodiment of a rolling bearing 1 in which the rotational position and/or rotational speed of the two bearing rings 2 and 3 relative to one another can be measured by one or more sensors 5.

Advantageously, contour projections 8 and/or contour recesses 9 spaced apart from one another in the circumferential direction and/or arranged one behind the other can be provided on one of the bearing rings, for example the outer bearing ring 2, which can be detected by a corresponding sensor 5 when the bearing rings 2 and 3 are rotated relative to one another so that the contour projections 8 and/or contour recesses 9 run past the sensor 5.

It can be advantageous if two sets of contour projections 8 and/or contour recesses 9 are provided, which can, for example, be arranged in different planes, e.g. two radial planes perpendicular to the bearing axis of rotation, which are spaced apart from each other in the axial direction, cf. FIG. 6.

From the information provided by the two sensors 5 monitoring the different sets of contour projections 8 and/or recesses 9, the rotational position and/or rotational speed can be accurately determined.

The contour projections 8 may be, for example, narrow, strip-shaped projections that extend in the axial direction and may project towards said sensor 5 from a circumferential surface on the bearing ring 2 that the sensor 5 monitors on the bearing ring 3. Alternatively or additionally, contour recesses 9 may be provided, for example in the form of holes or slots which extend in the axial direction and may be machined radially into the circumferential surface of the scanned bearing ring 2.

As shown in the right half of the illustration of FIG. 6, the contour projections 8 and/or the contour recesses 9 may be spaced from one another in the circumferential direction.

Advantageously, the modifications in the sensor signal are converted in such a way that a position in relation to one another can be measured by means of two measurement signals. In this way, the direction of rotation of the bearing rings 2 and 3 relative to one another can be determined.

By another signal modification over the circumference, which occurs only once, there can also, for instance, be indicated the zero position of the system.

We claim:

1. A rolling bearing comprising:
two bearing rings;
rolling elements running between the two bearing rings; and
a sensor for detecting movements and/or positions of the two bearing rings relative to one another,
wherein the sensor is fastened to one of the two bearing rings and is directed towards a measurement surface on the other of the two bearing rings, wherein the measurement surface comprises a contour projection projecting towards the sensor and/or a contour recess open towards the sensor in the form of a groove or a blind hole, wherein the contour projection and/or the groove influences a measurement signal of the sensor and the movement of which relative to the sensor transverse to a main signal direction of the sensor modifies the measurement signal of the sensor,
wherein the contour projection and/or the contour recess has two contour portions made of different materials and that are configured to generate different sensor signal responses.

2. The rolling bearing of claim 1, wherein the contour projection has an elongated, narrow strip which faces the sensor with a narrow end face and projects from the surface of the other of the two bearing rings scanned by the sensor towards the sensor.

3. The rolling bearing of claim 1, wherein the contour recess has an elongated, narrow groove, and wherein an open side of the groove faces the sensor.

4. The rolling bearing of claim 1, wherein the contour projection and/or the contour recess is materially homogeneous, and wherein the contour recess is a single integral piece from the material of the other of the two bearing rings.

5. The rolling bearing of claim 1, wherein the contour projection and/or the contour recess at least partially has a separate contour element fixedly attached to the other of the two bearing rings.

6. The rolling bearing of claim 1, wherein the two contour portions are at least partially superimposed in a direction towards the sensor, and wherein at least one of the two contour portions is made of a material at least partially configured to pass through the measurement signal.

7. The rolling bearing of claim 6, wherein the two contour portions are in planes that are differently inclined and/or differently adjusted with respect to the sensor main signal direction.

8. The rolling bearing of claim 7, wherein the two contour portions have a groove bottom and/or groove wall portion of a groove in the other of the two bearing rings and a surface of a groove filler at least partially closing the groove.

9. The rolling bearing of claim 8, wherein the sensor is configured to detect the two contour portions so the sensor generates different signal responses for the two contour portions made of different materials and/or with different angles of inclination to a main sensor axis.

10. The rolling bearing of claim 8, further comprising a separate sensor for each of the two contour portions.

11. The rolling bearing of claim 1, wherein the sensor is configured to determine axial movements and/or positions of the two bearing rings relative to one another, wherein the measurement surface scanned by the sensor is a circumferential surface of the other of the two bearing rings, wherein the contour projection and/or the contour recess extend along the circumferential surface, and wherein the contour projection or the contour recess extends in a radial direction from or into the circumferential surface, respectively.

12. The rolling bearing of claim 11, wherein the contour projection and/or the contour recess on the circumferential surface of the other of the two bearing rings scanned by the sensor extends in a plane perpendicular to an axis of rotation of the two bearing rings.

13. A rolling bearing comprising:
two bearing rings;
rolling elements running between the two bearing rings; and
a sensor for detecting movements and/or positions of the two bearing rings relative to one another,
wherein the sensor is fastened to one of the two bearing rings and is directed towards a measurement surface on the other of the two bearing rings, wherein the measurement surface comprises a contour projection projecting towards the sensor and/or a contour recess open towards the sensor in the form of a groove or a blind hole, wherein the contour projection and/or the groove influences a measurement signal of the sensor and the movement of which relative to the sensor transverse to a main signal direction of the sensor modifies the measurement signal of the sensor,
wherein the sensor is configured to determine radial movements of the two bearing rings relative to one another, wherein the contour projection and/or the contour recess is on an axial surface of the other of the two bearing rings, and wherein the contour projection or the contour recess projects or is recessed in the axial direction from or into the axial surface, respectively.

14. The rolling bearing of claim 13, wherein the contour projection and/or the contour recess has two contour portions made of different materials and that are configured to generate different sensor signal responses.

15. The rolling bearing of claim 14, wherein the two contour portions are at least partially superimposed in a direction towards the sensor, and wherein at least one of the two contour portions is made of a material at least partially configured to pass through the measurement signal.

16. The rolling bearing of claim 13, wherein the contour projection and/or contour recess in the axial surface extends along a cylindrical surface around an axis of rotation of the rolling bearing.

17. The rolling bearing of claim 1, wherein the sensor is configured to determine a rotational angle and/or a rotational speed of the two bearing rings relative to one another, wherein the measurement surface has a plurality of separate contour projections and/or recesses in the circumferential direction.

18. The rolling bearing of claim 1, wherein the sensor is within a bearing ring cross-section of the one of the two bearing rings and/or within a bearing ring mounting space, recessed in the one of the two bearing rings.

19. The rolling bearing of claim 1, having no more sensors than the one sensor.

20. The rolling bearing of claim 1, wherein the sensor is configured as an inductive sensor.

* * * * *